(12) United States Patent
Mishima et al.

(10) Patent No.: US 12,459,122 B2
(45) Date of Patent: Nov. 4, 2025

(54) AREA SETTING DEVICE, RACK, CONTROL SYSTEM, AREA SETTING METHOD, AND NON-TRANSITORY COMPUTER READABLE MEDIUM STORING PROGRAM

(71) Applicant: OMRON Corporation, Kyoto (JP)

(72) Inventors: Kazuma Mishima, Kyoto (JP); Tetsuya Akagi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 273 days.

(21) Appl. No.: 17/730,421

(22) Filed: Apr. 27, 2022

(65) Prior Publication Data

US 2022/0362933 A1 Nov. 17, 2022

(30) Foreign Application Priority Data

May 13, 2021 (JP) ................................. 2021-081920

(51) Int. Cl.
*B25J 9/16* (2006.01)
(52) U.S. Cl.
CPC ........... *B25J 9/1676* (2013.01); *B25J 9/1651* (2013.01); *B25J 9/1664* (2013.01); *B25J 9/1694* (2013.01)
(58) Field of Classification Search
CPC ...... B25J 9/1676; B25J 9/1651; B25J 9/1664; G05B 2219/40203; G05D 1/0214
See application file for complete search history.

(56) References Cited

U.S. PATENT DOCUMENTS

| | | | |
|---|---|---|---|
| 4,773,815 A * | 9/1988 | Lemelson | B25J 5/005 901/41 |
| 9,832,352 B2 * | 11/2017 | Linnell | G06T 15/205 |
| 2006/0049939 A1 | 3/2006 | Haberer et al. | |
| 2008/0040040 A1 | 2/2008 | Goto et al. | |
| 2009/0268029 A1 * | 10/2009 | Haussmann | F16P 3/14 348/E7.085 |
| 2014/0005827 A1 | 1/2014 | Ogawa et al. | |
| 2014/0067121 A1 | 3/2014 | Brooks et al. | |
| 2014/0277723 A1 | 9/2014 | Nishimura et al. | |

(Continued)

FOREIGN PATENT DOCUMENTS

| | | |
|---|---|---|
| EP | 3437804 A1 | 2/2019 |
| JP | 2000263489 A | 9/2000 |

(Continued)

OTHER PUBLICATIONS

Extended European Search Report issued in EP Appln. No. 22171108.8 mailed Oct. 7, 2022.

(Continued)

*Primary Examiner* — Wade Miles
*Assistant Examiner* — Mohammed Yousef Abuelhawa
(74) *Attorney, Agent, or Firm* — ROSSI, KIMMS & McDOWELL LLP (57) ABSTRACT

A technique shortens the time taken to adjust a protection area. An area setting device includes a setting unit that sets a protection area in at least a part of a surrounding environment of a robot to detect an entry of an object, an obtainer that obtains surrounding information about the robot, and a storage prestoring a set value for the protection area and the surrounding information associated with each other. The setting unit sets the protection area based on the set value read from the storage.

14 Claims, 7 Drawing Sheets

(56) References Cited

U.S. PATENT DOCUMENTS

| | | | |
|---|---|---|---|
| 2016/0016315 A1* | 1/2016 | Kuffner, Jr. | B25J 19/06 901/49 |
| 2016/0062345 A1* | 3/2016 | Stubbs | G05B 19/41895 701/2 |
| 2016/0167227 A1 | 6/2016 | Wellman et al. | |
| 2016/0167228 A1 | 6/2016 | Wellman et al. | |
| 2016/0354927 A1 | 12/2016 | Kikkeri et al. | |
| 2017/0021499 A1 | 1/2017 | Wellman et al. | |
| 2017/0080567 A1* | 3/2017 | Quinquis | G05D 1/028 |
| 2017/0106532 A1 | 4/2017 | Wellman et al. | |
| 2017/0355079 A1* | 12/2017 | Takahashi | B25J 9/1676 |
| 2018/0120804 A1* | 5/2018 | Higuchi | F16P 3/14 |
| 2018/0141211 A1 | 5/2018 | Wellman et al. | |
| 2018/0361571 A1* | 12/2018 | Georgeson | B25J 9/109 |
| 2019/0299412 A1* | 10/2019 | Schwer | G06T 7/70 |
| 2019/0377322 A1* | 12/2019 | Hornung | G06T 7/80 |
| 2020/0042005 A1* | 2/2020 | Xiong | G05D 1/0214 |
| 2020/0331146 A1 | 10/2020 | Vu | |
| 2020/0368909 A1 | 11/2020 | Sejimo | |
| 2021/0053227 A1 | 2/2021 | Wartenberg et al. | |
| 2021/0205994 A1* | 7/2021 | Dai | G05B 19/41815 |
| 2022/0203538 A1 | 6/2022 | Ning | |

FOREIGN PATENT DOCUMENTS

| | | |
|---|---|---|
| JP | 2002264070 A | 9/2002 |
| JP | 2005309990 A | 11/2005 |
| JP | 2010208002 A | 9/2010 |
| JP | 2014008562 A | 1/2014 |
| JP | 2016209953 A | 12/2016 |
| JP | 2017144542 A | 8/2017 |
| JP | 2018504333 A | 2/2018 |
| JP | 2019193974 A | 11/2019 |
| WO | 2020069716 A1 | 4/2020 |
| WO | 2020240977 A1 | 12/2020 |

OTHER PUBLICATIONS

Office Action issued in Chinese Appln. No. 202210439625.2, mailed Nov. 14, 2024. English translation provided.

Office Action issued in Japanese Appln. No. 2021-081920, mailed Oct. 15, 2024. English machine translation provided.

European Communication issued in European Appln. No. 22171108.8, mailed Feb. 21, 2025.

* cited by examiner

AREA SETTING DEVICE, RACK, CONTROL SYSTEM, AREA SETTING METHOD, AND NON-TRANSITORY COMPUTER READABLE MEDIUM STORING PROGRAM

CROSS-REFERENCE TO RELATED APPLICATION

This application claims priority to Japanese Patent Application No. 2021-081920 filed on May 13, 2021, the contents of which are incorporated herein by reference.

FIELD

The present invention relates to an area setting device.

BACKGROUND

In an environment in which a robot and a person work together, an imaginary protection area may be set near the robot to monitor whether the person enters the protection area with a sensor. The protection area may be set with respect to a movable area of the robot based on a safety distance. When the person enters the protection area, the operation of the robot is decelerated or stopped to ensure the safety of the person. Patent Literature 1 describes decelerating or stopping the operation of the robot when the person is determined to be within a predetermined range.

CITATION LIST

Patent Literature

Patent Literature 1: Japanese Unexamined Patent Application Publication No. 2014-8562

SUMMARY

Technical Problem

The protection area is to be adjusted in accordance with a surrounding environment of the installation location of the robot. For example, when an object such as a wall is near the installation location of the robot, the protection area is to be set based on the object such as a wall. For a three-dimensional protection area, the adjustment of the protection area can be complicated. The robot may be relocated depending on the state of production lines. In this case, adjusting the protection area in accordance with the surrounding environment of the installation location of the robot for every relocation of the robot is time-consuming. Changing the production lines thus takes a lengthy time.

In response to the above issue, one or more aspects of the present invention are directed to a technique for shortening the time taken to adjust a protection area.

Solution to Problem

An area setting device according to an aspect of the present invention includes a setting unit that sets a protection area in at least a part of a surrounding environment of a robot to detect an entry of an object, an obtainer that obtains surrounding information about the robot, and a storage prestoring a set value for the protection area and the surrounding information associated with each other. The setting unit sets the protection area based on the set value read from the storage.

In the above structure, the setting unit reads a set value for the protection area associated with surrounding information about the robot, which is information about an object around the robot, and sets the protection area based on the read set value. The protection area can be set based on the set value associated with the surrounding information about the robot, thus shortening the time taken to adjust the protection area. This reduces the time taken to change production lines.

The storage may prestore a plurality of the set values and a plurality of pieces of the surrounding information associated with each other, and the setting unit may read, of the plurality of set values, a set value associated with the surrounding information obtained by the obtainer from the storage. The surrounding information may include information indicating a contour of an object detected by a sensor. The surrounding information may include information indicating one or more feature points of an object detected by a sensor.

The area setting device according to the aspect of the present invention may include a controller that controls an operation of the robot, and a determiner that determines whether the object has entered the protection area. The controller may decelerate or stop the operation of the robot in response to the determiner determining that the object has entered the protection area. When a specific object is in the protection area set in at least the part of the surrounding environment of the robot, the setting unit may set the specific object in the protection area not to be a target for determination of an entry of the object to be performed by the determiner.

The area setting device according to the aspect of the present invention may include a controller that controls an operation of the robot and determines whether the object has entered the protection area. The controller may decelerate or stop the operation of the robot in response to the object entering the protection area. When a specific object is in the protection area set in at least the part of the surrounding environment of the robot, the setting unit may set the specific object in the protection area not to be a target for determination of an entry of the object to be performed by the controller.

The area setting device according to the aspect of the present invention may include a display that displays the protection area set in at least the part of the surrounding environment of the robot on a screen. The display may display the protection area set in at least the part of the surrounding environment of the robot and the specific object on the screen in a manner superimposed on each other. The protection area set in at least the part of the surrounding environment of the robot and the specific object may appear on a screen of an external device in a manner superimposed on each other.

One or more aspects of the present invention may be directed to a relocatable rack including the above area setting device and the above robot. One or more aspects of the present invention may be directed to a control system including the above area setting device and the above robot. One or more aspects of the present invention may be directed to an area setting method including at least part of the above processes, or to a program for implementing the method or a non-transitory storage medium storing the program. The above elements and processes may be combined with one another in any manner to form one or more aspects of the present invention.

Advantageous Effects

The technique according to the above aspects of the present invention shortens the time taken to adjust the protection area.

DETAILED DESCRIPTION

Example Use

Figure 1:
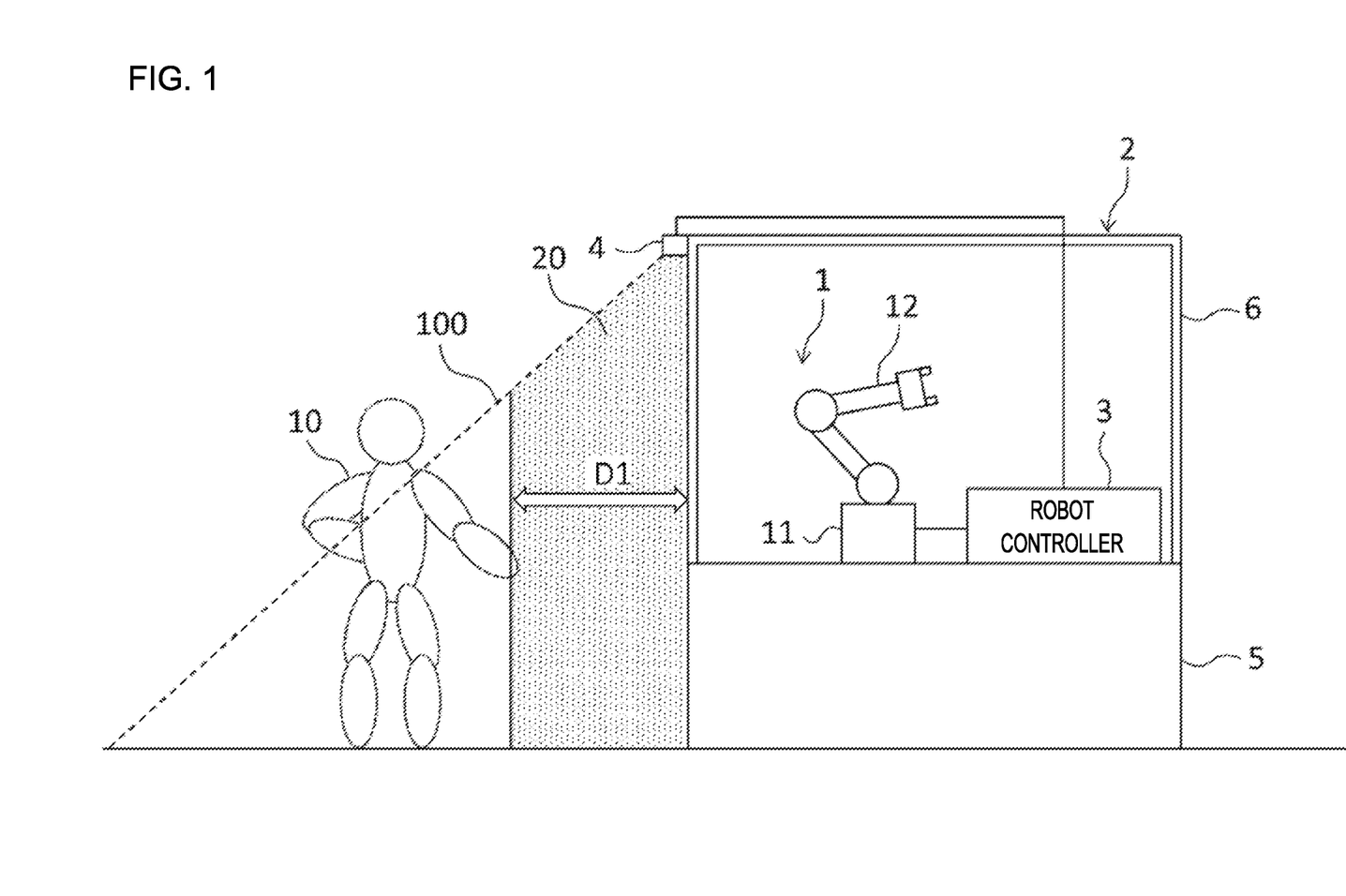
FIG. 1 is a schematic diagram of a control system.

FIG. 1 is a schematic diagram of a control system according to the present embodiment. In an environment in which a robot 1 and a person 10 such as a worker work together, for example, at a production site such as a factory, the control system in FIG. 1 controls the robot 1 while monitoring the motion of the person 10. The robot 1 in FIG. 1 is a vertical articulated robot. The robot 1 includes a base 11 and an arm 12 connected to the base 11. The robot 1 may not be a vertical articulated robot, and may be another type of robot, such as a horizontal articulated robot. The arm 12 includes an end-effector (hand) for gripping an object at its distal end. The robot 1 includes a servo motor to operate the arm 12.

Figure 2:
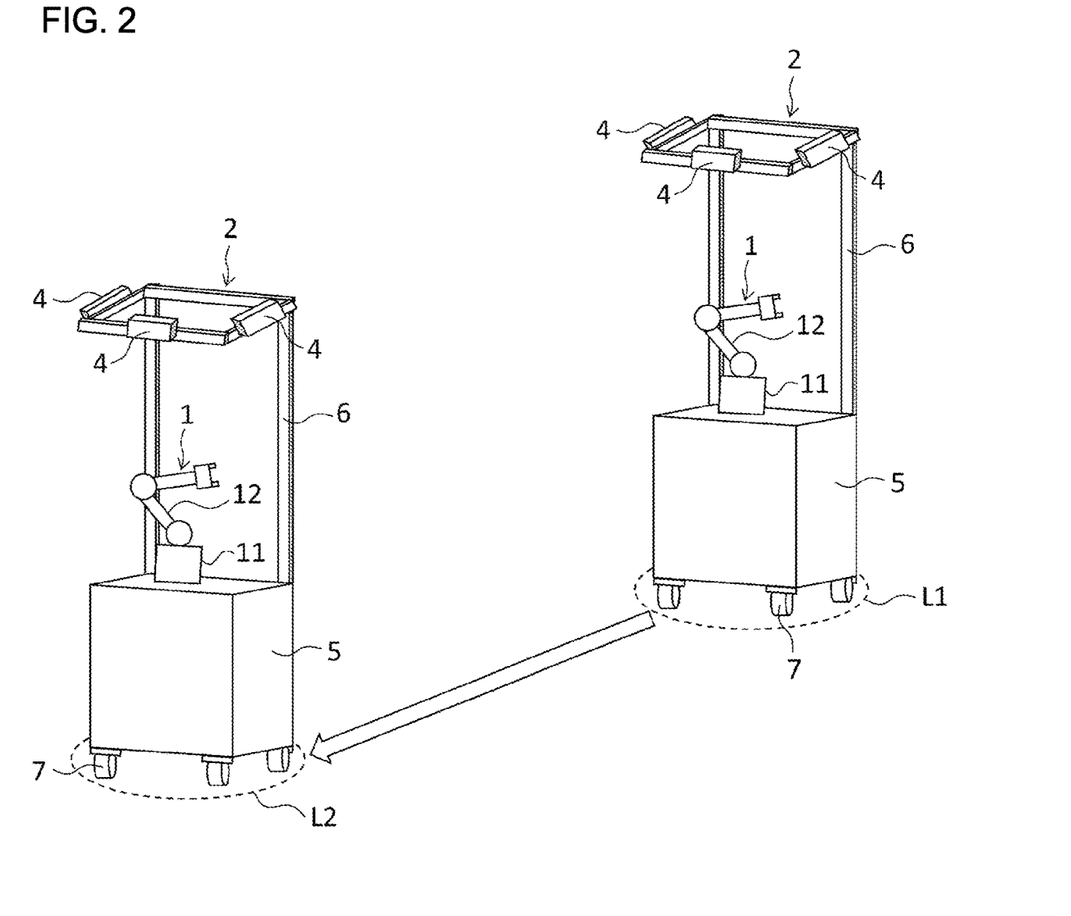
FIG. 2 is a diagram of multiple racks before relocation and after relocation.

A relocatable rack (housing) 2 receives the robot 1, a robot controller 3 for controlling the operation of the robot 1, and one or more sensor units 4. The robot controller 3 is an example of a controller. Each sensor unit 4 is an example of an area setting device. FIG. 2 is a diagram of the rack 2 before relocation and after relocation. The rack 2 includes a workbench 5 and a frame 6 on the workbench 5. The sensor units 4 are attached to an upper portion of the frame 6. In FIG. 1, the robot 1 and the robot controller 3 are placed on the workbench 5. The robot 1 may work on the workbench 5 or on a workbench located adjacent to the rack 2. The robot controller 3 may be inside the workbench 5. The robot 1 may be fixed to the rack 2 and integral with the rack 2. The base 11 of the robot 1 may be fixed to the workbench 5. The robot 1 may be removably mounted on the rack 2 and may be separate from the rack 2. The workbench 5 has wheels 7 on its bottom. The wheels 7 may be removable from the workbench 5, and may be attached to the workbench 5 for moving the rack 2. The structure of the rack 2 is not limited to the structure in FIG. 1. The rack 2 may not include the workbench 5. For example, the rack 2 may include a mounting table for receiving the robot 1, instead of the workbench 5, and the frame 6 on the mounting table. In this case, the robot 1 may work on a workbench located adjacent to the rack 2. The mounting table in the rack 2 may have the wheels 7.

The robot controller 3 controls the operation of the robot 1 in a wired or wireless manner. The robot controller 3 and the sensor units 4 are examples of the area setting device. Although the rack 2 receives the robot 1, the robot controller 3, and the sensor units 4 in the above example, the rack 2 may receive the robot 1 and the sensor units 4 with the controller 3 being separate from the rack 2. In other words, the robot controller 3 may be installed outside the rack 2.

As shown in FIG. 2, the rack 2 may include multiple sensor units 4. Although the rack 2 includes three sensor units 4 in the example in FIG. 2, the rack 2 may include more or fewer sensor units 4. The rack 2 may include one or two sensor units 4, or four or more sensor units 4.

Figure 3:
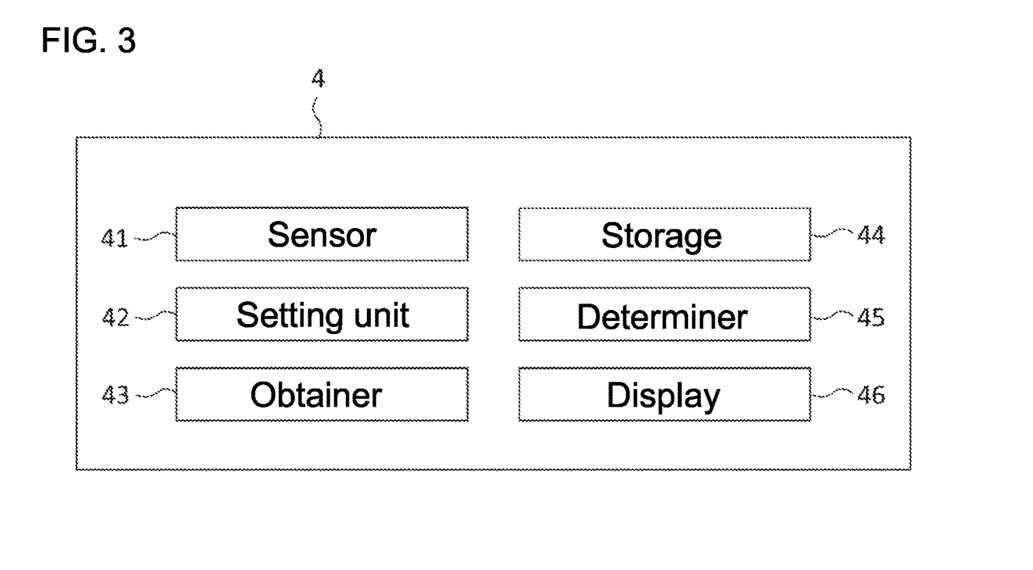
FIG. 3 is a block diagram of a sensor unit.

FIG. 3 is a block diagram of the sensor unit 4. The sensor unit 4 includes a sensor 41 as a detector, a setting unit 42 that sets a protection area 20, an obtainer 43 that obtains surrounding information about the robot 1, a storage 44 that stores various items of information and data, a determiner 45 that performs various determinations, and a display 46 that displays various items of information and data on a screen.

The sensor 41 detects the positions of objects including the person 10 at regular or irregular intervals. The sensor 41 may continuously detect the positions of objects. The sensor 41 detects objects around the rack 2. The sensor 41 may be a three-dimensional (3D) scanner. The sensor 41 may be a combination of a distance measurement sensor, such as a radio detection and ranging (radar) or a light detection and ranging (lidar), and a 3D scanner. The sensor 41 may be a two-dimensional (2D) scanner. The sensor 41 may be a combination of a 2D scanner and a distance measurement sensor.

The position of an object may be a relative position in a measurable area (detection range) 100 of the sensor 41. The position of an object may be specified using 3D coordinates (X-, Y-, and Z-coordinates). The position of an object may be specified using 2D coordinates (X- and Y-coordinates). The position of the person 10 may be the position of a part of the person 10. For example, the position of the person 10 may be the position of the hand, leg, or head of the person 10.

The setting unit 42 sets the protection area 20 in at least a part of the surrounding environment of the robot 1 placed on the rack 2. The protection area 20 is used to detect the entry of any objects, including the person 10. The setting unit 42 sets one or more protection areas 20 in at least a part of the surrounding environment of the robot 1. The protection area 20 may be a range specified using the 3D coordinates. The protection area 20 may be a range specified using the 3D coordinates. The protection area 20 may be a range specified using the 2D coordinates.

The obtainer 43 obtains information about the objects detected by the sensor 41 as the surrounding information about the robot 1 (hereafter, robot surrounding information). The sensor 41 may detect objects other than a person around the robot 1 and transmit information about the detected objects to the obtainer 43 as the robot surrounding information. For example, with no person around the robot 1, the sensor 41 may detect objects around the robot 1 and transmit information about the detected objects to the obtainer 43 as the robot surrounding information. The sensor 41 may detect objects around the robot 1 and transmit information about the detected objects to the obtainer 43. The obtainer 43 may remove information about a person from the information about the objects to obtain the robot surrounding information. The robot surrounding information may include information indicating the contour of an object detected by the sensor 41. The robot surrounding information may include information indicating one or more feature points of an object detected by the sensor 41.

The storage 44 prestores set values for the protection area 20 and the robot surrounding information associated with each other. A set value for the protection area 20 (hereafter, an area set value) is used to set the protection area 20 in at least a part of the surrounding environment of the robot 1. The setting unit 42 reads an area set value associated with the robot surrounding information obtained by the obtainer 43 from the storage 44 and sets the protection area 20 based on the read area set value. The setting unit 42 may read an area set value associated with information fully matching the robot surrounding information obtained by the obtainer 43 from the storage 44. The setting unit 42 may read an area set value associated with similar information having a predetermined correspondence with the robot surrounding information obtained by the obtainer 43 from the storage 44. The setting unit 42 may determine whether the robot surrounding information obtained by the obtainer 43 and an area set value stored in the storage 44 have a predetermined correspondence with each other through machine learning using computation and artificial intelligence (AI).

As shown in FIG. 1, the protection area 20 is set between the robot 1 and the person 10. The protection area 20 is an imaginary 3D area for detecting the entry of the person 10. The protection area 20 is set near or in at least a part of the surrounding environment of a potentially hazardous source such as the robot 1. Although the protection area 20 is set frontward from the robot 1 in FIG. 1, the protection area 20 may be set laterally to or rearward from the robot 1. Multiple protection areas 20 may be set. The protection area 20 is set based on the operating range of the robot 1 in accordance with safety standards. A distance D1 in a planar direction of the protection area 20 may be a safety distance defined by the safety standards. For example, when an object such as the person 10 enters the protection area 20, safety control such as decelerating or stopping the operation of the robot 1 is performed.

The sensor 41 is positioned and set to have a field of view including the protection area 20 within the measurable area 100 of the sensor 41. The sensor unit 4 is attached to the rack 2. Thus, the sensor 41 that has undergone the position adjustment and the setting of the field of view at the location of the rack 2 before relocation (location L1 in FIG. 2) eliminate position adjustment or setting of the field of view at the location of the rack 2 after relocation (location L2 in FIG. 2). The sensor 41 may undergo position readjustment or resetting of the field of view at the location of the rack 2 after relocation.

Figure 4A:
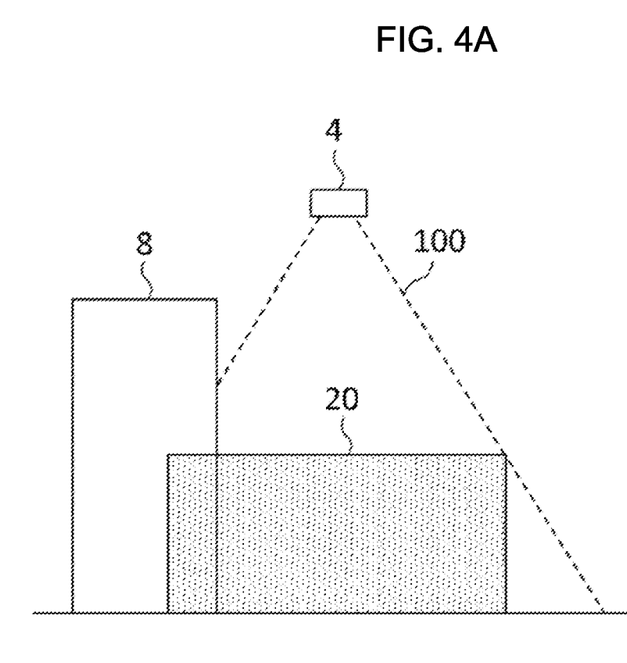
FIGS. 4A and 4B are plan views each showing the range of a protection area.
Figure 4B:
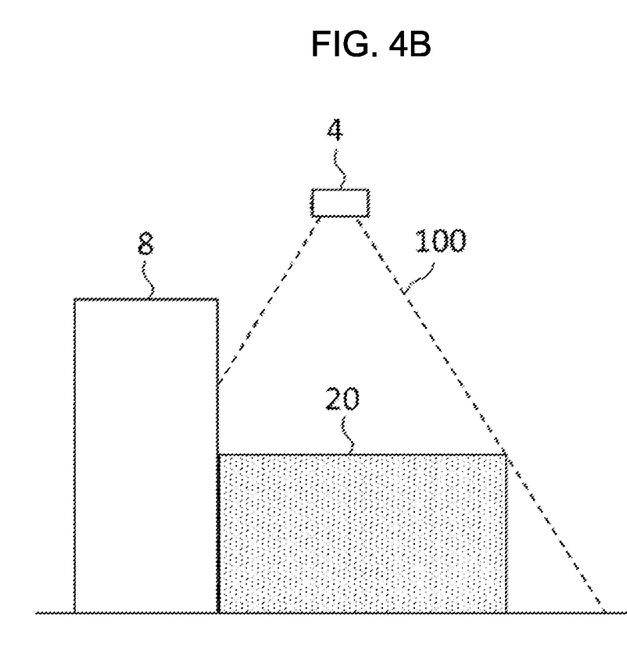

When the rack 2 is relocated to any selected destination, the range of the protection area 20 is to be changed in accordance with an object around the rack 2 at the destination location, such as a wall, a shelf to store tools, and a workbench different from the workbench 5. FIGS. 4A and 4B are plan views each showing the range of the protection area 20 with the rack 2 relocated to a destination. As shown in FIG. 4A, for a wall 8 partially in the protection area 20 set in at least a part of the surrounding environment of the robot 1, for example, the sensor 41 may erroneously detect the wall 8. More specifically, safety control such as decelerating or stopping the operation of the robot 1 is performed upon detection of the wall, as an object entering the protection area 20. Thus, as shown in FIG. 4B, the range of the protection area 20 is to be changed in accordance with the wall 8 around the rack 2.

Figure 5:
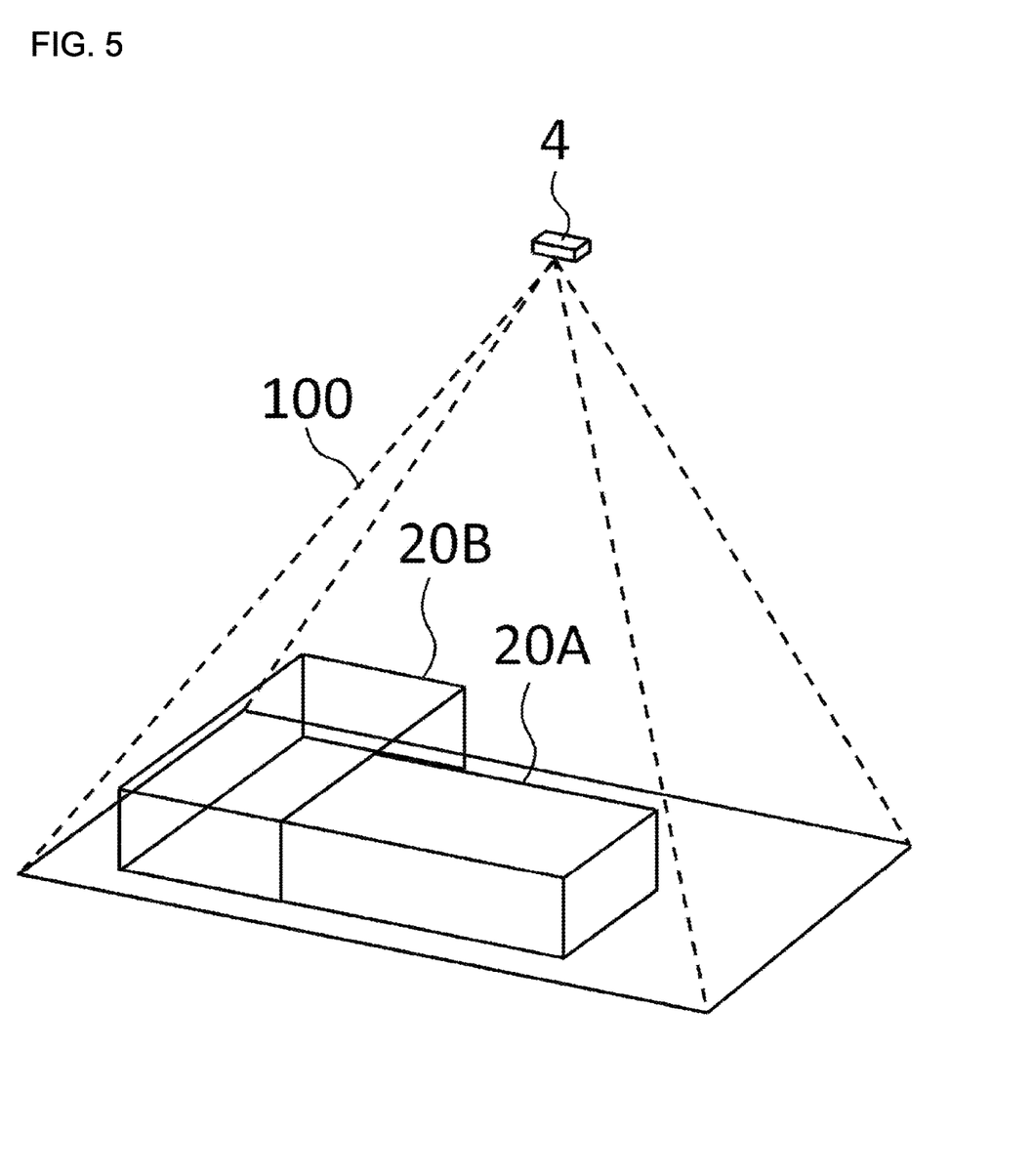
FIG. 5 is a diagram describing changing the range of the protection area.

FIG. 5 is a diagram describing changing the range of the protection area 20. For example, an area 20A shown in FIG. 5 indicates the range of the protection area 20 set for the rack 2 relocated to the location L1 in FIG. 2. For example, an area 20B shown in FIG. 5 indicates the range of the protection area 20 set for the rack 2 relocated to the location L2 in FIG. 2. The setting unit 42 reads an area set value associated with the robot surrounding information, which is the information about an object around the rack 2, from the storage 44, and sets the protection area 20 based on the read area set value. The protection area 20 can be set based on an area set value associated with the robot surrounding information, thus shortening the time taken to adjust a protection area. This reduces the time taken to change production lines.

When the storage 44 stores no area set value associated with the robot surrounding information, the setting unit 42 may generate a warning or an alert to the user or a manager. In this manner, the setting unit 42 may also function as a notifier. The warning or the alert may include a message indicating that the storage 44 stores no area set value associated with the robot surrounding information. The warning or the alert may include a message indicating that the rack 2 has been relocated to a new destination. The user or the manager can thus be notified that the rack 2 has been relocated to a new destination. The user or the manager may change the location of the rack 2 to a destination at which the rack 2 is previously relocated to reproduce the previous work environment.

For the rack 2 including multiple sensor units 4, the storage 44 in each sensor unit 4 stores area set values and the robot surrounding information associated with each other. Thus, each sensor unit 4 can set the protection area 20 independently. The number of sensor units 4 can be determined in the design stage. The positions of the sensor units 4 can be fixed in the design stage. The protection area 20 is set in the same manner for the rack 2 including one sensor unit 4 and for the rack 2 including multiple sensor units 4.

The above example uses facilitate understanding of the present invention and do not limit the present invention.

Apparatus Configuration

Figure 6:
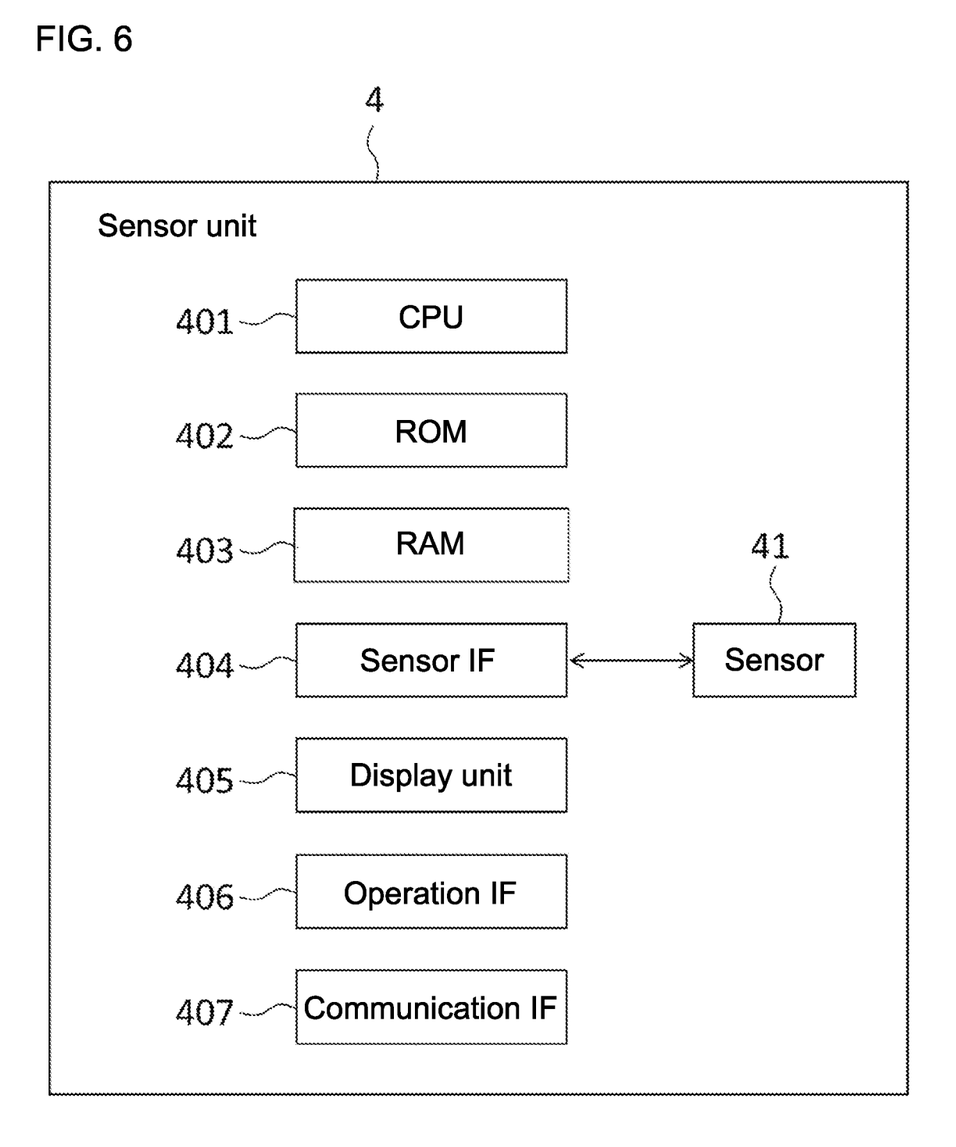
FIG. 6 is a block diagram of the sensor unit showing its hardware configuration.

FIG. 6 is a block diagram of the sensor unit 4 showing its hardware configuration. The sensor unit 4 includes a central processing unit (CPU) 401, a read-only memory (ROM) 402, a random-access memory (RAM) 403, a sensor interface (IF) 404, a display unit 405, an operation IF 406, and a communication IF 407. The ROM 402 stores programs executable by the CPU 401. The RAM 403 provides a work area for the CPU 401 to execute the programs.

The sensor IF 404 processes positional information about an object and the robot surrounding information transmitted from the sensor 41 and transmits the resultant data to the CPU 401. The display unit 405 is, for example, a liquid crystal display (LCD). The display unit 405 displays various items of information. The operation IF 406 receives various instructions input from the user such as the person 10, and transmits the input information to the CPU 401. The operation IF 406 may provide a notification to the user such as the person 10 with, for example, sound or light based on an instruction from the CPU 401. The communication IF 407 communicates with the CPU 401 and with an external device in a wired or wireless manner.

As shown in FIG. 3, the sensor unit 4 includes the sensor 41, the setting unit 42, the obtainer 43, the storage 44, the determiner 45, and the display 46. At least one of the functions of these components may be implemented using a software program stored in the ROM 402. More specifically, the CPU 401 may load an intended program into the RAM 403 and execute the program to perform various computations or to control the hardware resources, thus achieving the functions of the components.

The determiner 45 determines, every time the sensor 41 detects the position of an object, whether the object has entered the protection area 20, and transmits the determination result to the robot controller 3. When the object has entered the protection area 20, the determiner 45 transmits a determination result indicating that the object has entered the protection area 20 to the robot controller 3. When the object has not entered the protection area 20, the determiner 45 transmits a determination result indicating that the object has not entered the protection area 20 to the robot controller 3. When the object has entered the protection area 20, the robot controller 3 decelerates or stops the operation of the robot 1. When the object has not entered the protection area 20, the robot controller 3 continues the operation of the robot 1.

The safety distance is calculated using the response speed and a measurement error of the sensor 41 and the stop duration of the robot 1. The stop duration of the robot 1 is the time taken for the robot 1 to actually stop after the robot controller 3 performs control to stop the operation of the robot 1. The rack 2 includes the robot 1 and the sensor unit 4. The storage 44 prestores the response speed and measurement errors of the sensor 41 and the stop duration of the robot 1.

The safety distance is calculated using Formula 1 below based on the safety standards (ISO 13855).

$$S=(K\times T)+C+D \quad (1)$$

In the formula, K is the traveling speed of the person 10 (e.g., K=1600 mm/s), T is the sum of the response speed of the sensor 41 (e.g., 0.1 s) and the stop duration of the robot 1 (e.g., 0.7 s), C is the length of a part of the person 10 (e.g., the length of hand of the person 10=208 mm, the length of arm of the person 10=850 mm), and D is a measurement error of the sensor 41 (e.g., D=100 mm).

Figure 7:
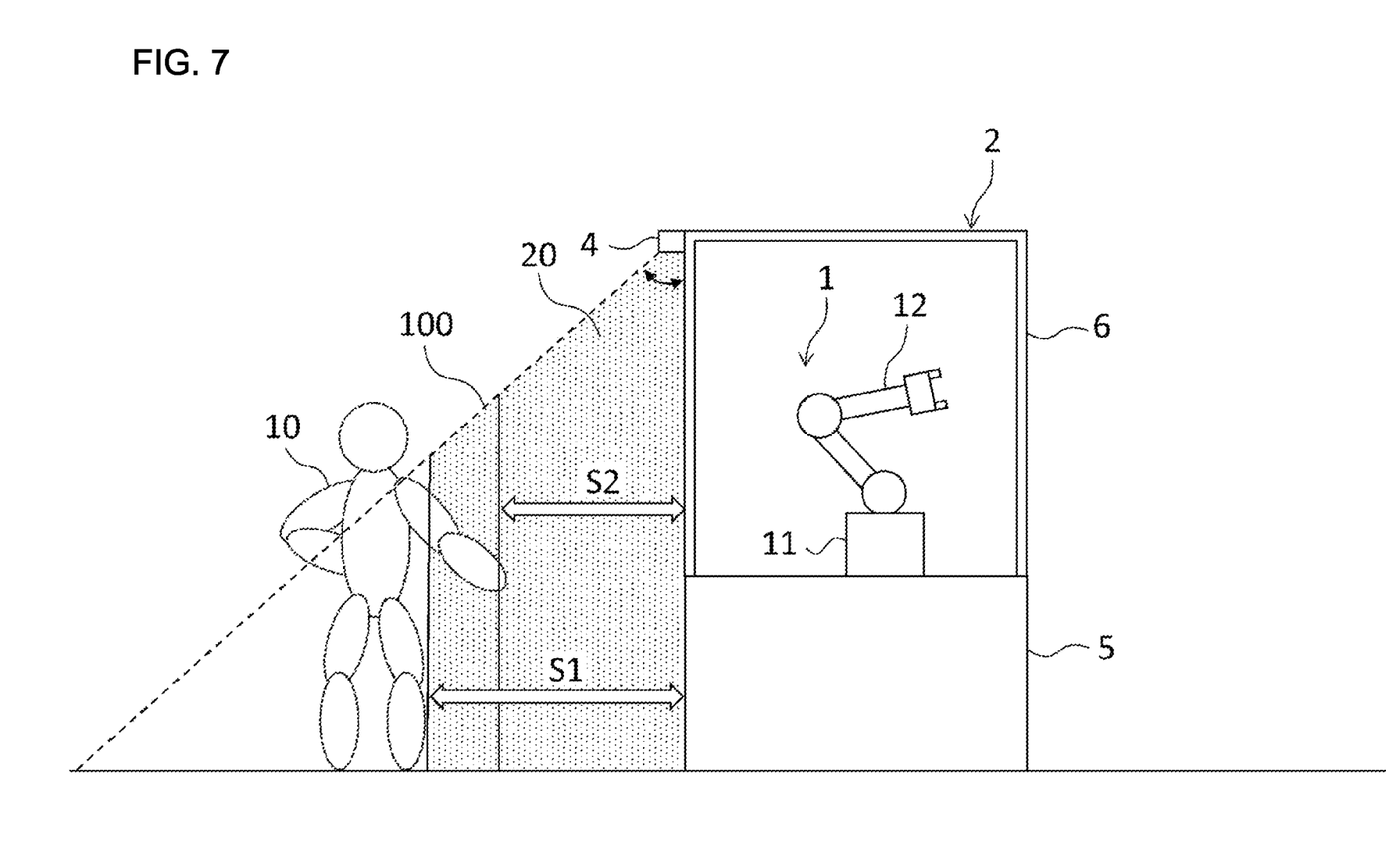
FIG. 7 is a diagram describing a safety distance.

FIG. 7 is a diagram describing the safety distance. In FIG. 7, the height from the floor to the sensor unit 4 is 2200 mm. The sensor 41 has a viewing angle of 60 degrees. The workbench 5 has a height of 700 mm. The sensor 41 being a 2D scanner detects the entry of a leg of a person into the protection area 20. In this case, a safety distance S1 is calculated as 2230 mm from 1600 mm/s×(0.1 s+0.7 s)+850 mm+100 mm. The sensor 41 being a 3D scanner detects the entry of an arm of a person into the protection area 20. In this case, a safety distance S2 is calculated as 1580 mm from 1600 mm/s×(0.1 s+0.7 s)+208 mm+100 mm. Based on the length of an arm of a person, the safety distance S1 (2230 mm) in detecting the entry of a leg of a person into the protection area 20 is longer than the safety distance S2 (1580 mm) in detecting the entry of an arm of a person into the protection area 20.

A method for adjusting the protection area 20 in accordance with an object around the rack 2 will now be described. For example, the user connects an information processing apparatus to the sensor unit 4. The information processing apparatus is an example of an external device. The information processing apparatus may be a personal computer or a tablet. The information processing apparatus connected to the sensor unit 4 may be installed on the rack 2. For example, the information processing apparatus may be placed on the workbench 5, or may be located on the upper surface or the side surface of the workbench 5.

Figure 8:
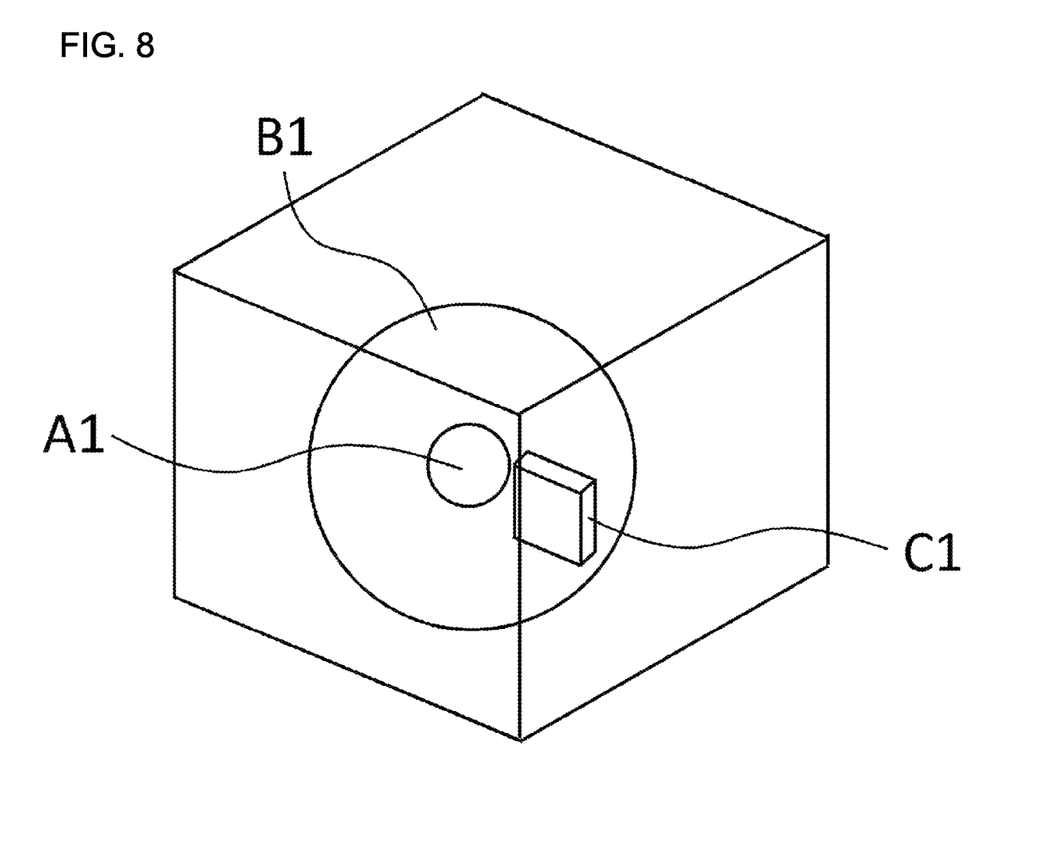
FIG. 8 is a diagram of an example image appearing on a screen.

The user displays an image AI of a potentially hazardous source such as the robot 1, an image B1 of the protection area 20, and an image Cl of a desk around the rack 2 detected by the sensor 41 on a screen of the information processing apparatus through a graphical user interface (GUI) in a setting tool in the information processing apparatus. FIG. 8 is a diagram of an example image appearing on the screen of the information processing apparatus. As shown in FIG. 8, the image AI of the robot 1, the image B1 of the protection area 20, and the image Cl of an object around the rack 2 detected by the sensor 41 appear. In FIG. 8, the image B1 of the protection area 20 and the image Cl of the object around the rack 2 appear in a manner superimposed on each other. For example, when the rack 2 is relocated to a predetermined new destination, the storage 44 does not store the robot surrounding information for the destination location. Thus, when any object such as a desk is in the protection area 20, the user adjusts the protection area 20 appearing on the screen of the information processing apparatus using the GUI in the setting tool to avoid including the object such as a desk in the protection area 20.

After the protection area 20 is adjusted, the area set value and the robot surrounding information are stored into the storage 44 with the setting tool in a manner associated with each other. The robot surrounding information stored in the storage 44 may include information indicating the contour of an object, or may include information indicating one or more feature points of an object. The setting tool may automatically extract the contour of an object appearing on the screen of the information processing apparatus and store the extracted contour of the object into the storage 44 as robot surrounding information. The user may also manually extract one or more feature points of an object appearing on the screen of the information processing apparatus using the GUI in the setting tool and store the extracted one or more feature points into the storage 44 as robot surrounding information. One or more feature points of an object appearing on the screen of the information processing apparatus may be extracted with a feature point extraction method such as pattern matching and the extracted one or more feature points may be stored into the storage 44 as robot surrounding information.

The process for adjusting the protection area 20 and the process for storing an area set value and robot surrounding information into the storage 44 are performed every time the rack 2 is relocated to a different destination. This stores multiple area set values and multiple pieces of information associated with each other into the storage 44. Thus, the storage 44 prestores multiple area set values and multiple pieces of robot surrounding information associated with each other.

When any object such as a desk is in the protection area 20, the user may define the object, such as a desk, in the protection area 20 appearing on the screen of the information processing apparatus as a specific object using the GUI in the setting tool. This excludes the specific object from targets for the detection of the entry of an object into the protection area 20. The specific object does not affect the operation of the robot 1 and may be referred to as background information. The range of the specific object may be set wider than the range of the object in the protection area 20 appearing on the screen of the information processing apparatus. More specifically, the range of the object in the protection area 20 appearing on the screen of the information processing apparatus may include a margin. This more reliably excludes the specific object from targets for the detection of the entry of an object into the protection area 20. The protection area 20 and a specific object appearing on the screen of the information processing apparatus in a manner superimposed on each other allow the user to learn that the specific object is in the protection area 20. The protection area 20 and a specific object may appear on the screen of the display 46 in a manner superimposed on each other. The setting tool stores robot surrounding information and information about a specific object included in the robot surrounding information associated with each other into the storage 44.

When a specific object is in the protection area 20 set in at least a part of the surrounding environment of the robot 1, the setting unit 42 sets the specific object in the protection area 20 set in at least a part of the surrounding environment of the robot 1 not to be a target for the determination of the entry of an object by the determiner 45. Thus, when the specific object is in the protection area 20, the determiner 45 transmits a determination result indicating that no object has entered the protection area 20 to the robot controller 3. Thus, when the specific object is in the protection area 20, the robot controller 3 can continue the operation of the robot 1.

In the above examples, the robot controller 3 continues, decelerates, or stops the operation of the robot 1 based on the determination result of the determiner 45. However, the robot controller 3 may perform a process performed by the determiner 45. In other words, the robot controller 3 may have the function of the determiner 45. The robot controller 3 may determine, every time the sensor 41 detects the position of an object, whether the object has entered the protection area 20. When the object has entered the protection area 20, the robot controller 3 decelerates or stops the operation of the robot 1. When the object has not entered the protection area 20, the robot controller 3 continues the operation of the robot 1. When a specific object is in the protection area 20 set in at least a part of the surrounding environment of the robot 1, the setting unit 42 may set the specific object in the protection area 20 set in at least the part of the surrounding environment of the robot 1 not to be a target for the determination of the entry of an object by the robot controller 3. Thus, when the specific object is in the protection area 20, the robot controller 3 can continue the operation of the robot 1. A programmable logic controller (PLC) or a dedicated processor may have the function of the determiner 45. The PLC or the dedicated processor having the function of the determiner 45 may be installed on the rack 2, or may be installed outside the rack 2. Other machines or devices may have the function of the determiner 45 without being limited to the implementations described above.

The processes described above may be a method implementable by a computer. A program for causing a computer to perform the processes described above may be provided to a computer through a network or with, for example, a computer-readable recording medium that stores data in a non-transitory manner. The computer can read and execute the program to function as the sensor unit 4. The computer may read and execute the program to function as the sensor unit 4.

APPENDIX

An area setting device (4), comprising:
a setting unit (42) configured to set a protection area (20) to detect an entry of an object, the protection area (20) being in at least a part of a surrounding environment of a robot (1);
an obtainer (43) configured to obtain surrounding information about the robot (1); and
a storage (44) prestoring a set value for the protection area (20) and the surrounding information associated with each other,
wherein the setting unit (42) sets the protection area (20) based on the set value read from the storage (44).

REFERENCE SIGNS LIST 1 robot
2 rack
3 robot controller
4 sensor unit
5 workbench
6 frame
10 person
20 protection area
41 sensor
42 setting unit
43 obtainer
44 storage
45 determiner
46 display
100 measurable area

What is claimed is:

1. An area setting device, comprising:
a processor configured to set a protection area to detect an entry of an object, the protection area being in at least a part of a surrounding environment of a robot that is disposed on a relocatable rack;
a sensor configured to obtain surrounding information about the robot disposed on the relocatable rack; and
a storage storing a set value for the protection area and the surrounding information obtained by the sensor in association with each other,
wherein, in a case where the relocatable rack is moved to a location, the processor:
reads, from the storage, the set value for the protection area associated with the surrounding information obtained by the sensor after the relocatable rack is moved to the location and sets the protection area based on the set value for the protection area read from the storage, in a case where the set value for the protection area associated with the surrounding information obtained by the sensor after the relocatable rack is moved to the location is stored in the storage; and
generates a warning or an alert in a case where the set value for the protection area associated with the surrounding information obtained by the sensor after the relocatable rack is moved to the location is not stored in the storage.

2. The area setting device according to claim 1, wherein the storage stores a plurality of set values for the protection area and a plurality of pieces of surrounding information obtained by the sensor in association with each other, and
the processor reads, of the plurality of set values, the set value for the protection area associated with the surrounding information obtained by the sensor after the relocatable rack is moved to the location in the case where the set value for the protection area associated with the surrounding information obtained by the sensor after the relocatable rack is moved to the location is stored in the storage.

3. The area setting device according to claim 1, wherein the surrounding information obtained by the sensor includes information indicating a contour of an object detected by the sensor.

4. The area setting device according to claim 1, wherein the surrounding information obtained by the sensor includes information indicating one or more feature points of an object detected by the sensor.

5. The area setting device according to claim 1, further comprising:
a controller configured to control an operation of the robot;
wherein the processor determines whether the object has entered the protection area, and
the controller decelerates or stops the operation of the robot in response to the processor determining that the object has entered the protection area.

6. The area setting device according to claim 5, wherein when a specific object is in the protection area set in at least the part of the surrounding environment of the robot, the processor sets the specific object in the protection area not to be a target for determination of an entry of the object to be performed by the processor.

7. The area setting device according to claim 1, further comprising:
a controller configured to control an operation of the robot and to determine whether the object has entered the protection area,
wherein the controller decelerates or stops the operation of the robot in response to the object entering the protection area.

8. The area setting device according to claim 7, wherein when a specific object is in the protection area set in at least the part of the surrounding environment of the robot, the processor sets the specific object in the protection area not to be a target for determination of an entry of the object to be performed by the controller.

9. The area setting device according to claim 6, further comprising:
a display configured to display the protection area set in at least the part of the surrounding environment of the robot on a screen,
wherein the display displays the protection area set in at least the part of the surrounding environment of the robot and the specific object on the screen in a manner superimposed on each other.

10. The area setting device according to claim 6, wherein the processor causes the protection area set in at least the part of the surrounding environment of the robot and the specific object to be displayed on a screen of an external device in a manner superimposed on each other.

11. A relocatable rack, comprising:
the area setting device according to claim 1; and
the robot.

12. A control system, comprising:
the area setting device according to claim 1; and
the robot.

13. An area setting method, comprising:
setting, with a computer, a protection area to detect an entry of an object, the protection area being in at least a part of a surrounding environment of a robot that is disposed on a relocatable rack; and
obtaining, with the computer, surrounding information about the robot disposed on the relocatable rack,
wherein, in a case where the relocatable rack is moved to a location, the setting includes:
reading, from a storage storing a set value for the protection area and the surrounding information obtained by the computer associated with each other, the set value for the protection area associated with the surrounding information obtained by the computer after the relocatable rack is moved to the location and setting the protection area based on the set value for the protection area read from the storage, in a case where the set value for the protection area associated with the surrounding information obtained by the computer after the relocatable rack is moved to the location is stored in the storage; and
generating a warning or an alert in a case where the set value for the protection area associated with the surrounding information obtained by the computer after the relocatable rack is moved to the location is not stored in the storage.

14. A non-transitory computer readable medium storing a program for causing a computer to execute a process, comprising:
setting a protection area to detect an entry of an object, the protection area being in at least a part of a surrounding environment of a robot that is disposed on a relocatable rack; and
obtaining, with a sensor, surrounding information about the robot disposed on the relocatable rack,
wherein, in a case where the relocatable rack is moved to a location, the setting includes:
reading, from a storage storing a set value for the protection area and the surrounding information obtained by the sensor associated with each other, the set value for the protection area associated with the surrounding information obtained by the sensor after the relocatable rack is moved to the location and setting the protection area based on the set value for the protection area read from the storage, in a case where the set value for the protection area associated with the surrounding information obtained by the sensor after the relocatable rack is moved to the location is stored in the storage; and
generating a warning or an alert in a case where the set value for the protection area associated with the surrounding information obtained by the sensor after the relocatable rack is moved to the location is not stored in the storage.

* * * * *